(12) United States Patent
Nammatsu et al.

(10) Patent No.: US 8,006,134 B2
(45) Date of Patent: Aug. 23, 2011

(54) METHOD FOR ANALYZING FAULT CAUSED IN VIRTUALIZED ENVIRONMENT, AND MANAGEMENT SERVER

(75) Inventors: Toshihiro Nammatsu, Kawasaki (JP); Yasuaki Saito, Yokohama (JP)

(73) Assignee: Hitachi, Ltd, Tokyo (JP)

( * ) Notice: Subject to any disclaimer, the term of this patent is extended or adjusted under 35 U.S.C. 154(b) by 94 days.

(21) Appl. No.: 12/551,962

(22) Filed: Sep. 1, 2009

(65) Prior Publication Data

US 2010/0058108 A1 Mar. 4, 2010

(30) Foreign Application Priority Data

Sep. 4, 2008 (JP) .................................. 2008-227401
Jun. 4, 2009 (JP) .................................. 2009-135441

(51) Int. Cl.
*G06F 11/00* (2006.01)
(52) U.S. Cl. ........................................ 714/26; 714/6.12
(58) Field of Classification Search ................ 714/26
See application file for complete search history.

(56) References Cited

U.S. PATENT DOCUMENTS

| 7,124,139 | B2* | 10/2006 | Nemoto et al. ...................... 1/1 |
| 7,814,364 | B2* | 10/2010 | Sankaran et al. ................. 714/4 |
| 7,840,839 | B2* | 11/2010 | Scales et al. ...................... 714/13 |
| 2004/0068561 | A1* | 4/2004 | Yamamoto et al. ............ 709/224 |
| 2005/0015685 | A1* | 1/2005 | Yamamoto ........................ 714/54 |
| 2006/0129877 | A1* | 6/2006 | Yamamoto et al. ................ 714/6 |
| 2006/0212751 | A1* | 9/2006 | Yamamoto et al. ................ 714/6 |
| 2007/0174721 | A1* | 7/2007 | Yamamoto et al. .............. 714/42 |
| 2008/0276120 | A1* | 11/2008 | Yamamoto et al. ................ 714/4 |
| 2009/0125680 | A1* | 5/2009 | Ninose et al. ................. 711/114 |
| 2009/0199041 | A1* | 8/2009 | Fukui et al. ........................ 714/6 |

FOREIGN PATENT DOCUMENTS

| JP | 04-257035 | 9/1992 |
| JP | 2007-323244 | 12/2007 |

* cited by examiner

*Primary Examiner* — Scott T Baderman
*Assistant Examiner* — Kamini Patel
(74) *Attorney, Agent, or Firm* — Foley & Lardner LLP

(57) ABSTRACT

To enable easy and quick identification of the location of a fault in a virtualized environment, a physical server 20 is communicatively connected with a management server 10 accumulating and storing a first event history of a history of events having occurred in the virtual server 212 and a second event history of a history of events having occurred in the physical server 20. On receiving an event relating to a fault of a business process 2122 operating in the virtual server 212, the management server 10 searches the event histories as accumulated and stored for the second event history on the virtual server 212 having transmitted the same event and the first event history obtained from the table as stored on the physical server 20 implementing the virtual server 212 having transmitted the event, and identifies a cause of the fault based on a result of the search.

8 Claims, 18 Drawing Sheets

EVENT HISTORY TABLE 121

| SERVER NAME | OCCURRENCE DATE AND TIME | PROCESS NAME | MESSAGE | EVENT TYPE |
|---|---|---|---|---|
| pserver1 | 2008/4/1 10:30.1 | aa | Error occurred | Error |
| vserver1 | 2008/4/1 10:30.5 | aa | Error occurred | Error |
| vserver2 | 2008/4/1 15:30.1 | cc | Usage rate over 80% | Warning |
| pserver2 | 2008/4/1 15:30.5 | dd | AA assigned | Information |
| vserver1 | 2008/4/1 20:30.5 | cc | Connect error occurred | Error |
| ... | ... | ... | ... | |

FIG. 3A

ACTIVE SERVER MAPPING TABLE 122

| PROCESS NAME | VIRTUAL SERVER NAME | PHYSICAL SERVER NAME | VIRTUAL SERVER OPERATION STARTING DATE AND TIME |
|---|---|---|---|
| aa | vserver1 | pserver1 | 2008/04/01 08:00:00.000 |
| cc | vserver2 | pserver1 | 2008/04/01 08:30:00.000 |
| dd | vserver3 | pserver2 | 2008/04/01 08:00:00.000 |
| ee | vserver4 | pserver2 | 2008/04/01 09:30:30.000 |
| ... | ... | ... | ... |

FIG. 3B

VIRTUAL SERVER EVENT ANALYSIS POLICY TABLE 124

| SEARCH CONDITION (331) | CAUSE LOCATION (332) |
|---|---|
| Virtual server name = $virtual server$ & Message = .*connect error.* | LAN |
| Virtual server name = $virtual server$ & Process name = aa & Message = .*Error.* | HDD \|CPU |
| Virtual server name = $virtual server$ & Process name = bb & Message = .*fault.* | OS |
| Virtual server name = $virtual server$ & (Event type = Error \| Message = .*Error.*) | LAN \| HDD \| CPU \| Memory |
| ... | ... |

FIG. 3C

PHYSICAL SERVER EVENT ANALYSIS POLICY TABLE 125

| SEARCH CONDITION (341) | CAUSE LOCATION (342) | ERROR LEVEL (343) |
|---|---|---|
| Physical server name = $physical server$ & Process name = bb & Event type = Error | LAN | 4 |
| Physical server name = $physical server$ & Process name = aa & Message = .*error.* | CPU | 4 |
| Physical server name = $physical server$ & Message = .*memory fault.* | Memory | 4 |
| Physical server name = $physical server$ & Process name = ee | HDD | 4 |
| Physical server name = $physical server$ & Process name = bb & Message = .*warning.* | LAN | 3 |
| Physical server name ! = $physical server$ | Virtual server | 2 |
| ... | ... | ... |

FIG. 3D

ANALYSIS HISTORY TABLE 123

| VIRTUAL SERVER EVENT 351 | | | PHYSICAL SERVER EVENT 352 | | | ANALYSIS RESULT 353 | |
|---|---|---|---|---|---|---|---|
| SERVER NAME | PROCESS NAME | MESSAGE | SERVER NAME | PROCESS NAME | MESSAGE | CAUSE LOCATION 3531 | ERROR LEVEL 3532 |
| vserver1 | aa | Error occurred | pserver1 | aa | Error occurred | CPU | 4 |
| vserver1 | cc | connect error | pserver1 | bb | Network error occurred | LAN | 3 |
| vserver1 | cc | Unable to write | pserver1 | ee | Disk error | HDD | 4 |
| vserver2 | aa | Memory fault | — | — | — | Virtual server | 2 |
| vserver1 | aa | Error occurred | — | — | — | Business process | 1 |
| ... | ... | ... | ... | ... | ... | ... | ... |

FIG. 3E

CORRECTIVE ACTION TABLE 126

| ERROR LEVEL | ADDRESS |
|---|---|
| 1 | sendmail-m $lserver.message |
| 2 | rerun -p $lserver.process |
| 3 | systemcheck |
| 4 | migration -s $lserver |
| ... | ... |

FIG. 3F

APPLICATION MANAGEMENT TABLE 127

| AP NAME | PROCESS NAME | PROCESS ID | VIRTUAL SERVER NAME | RELATED SLA |
|---|---|---|---|---|
| AP01 | aa | 0001 | vserver1 | sla001, sla003 |
| AP02 | bb | 0002 | vserver1 | sla001 |
| AP03 | cc | 0003 | vserver2 | sla002 |
| AP04 | dd | 0004 | vserver3 | sla003 |
| : | : | : | : | : |

FIG. 3G

SLA DEFINITION TABLE 128

RESOURCES MANAGEMENT TABLE 129

DEPENDENCY MANAGEMENT TABLE 130

| VIRTUAL SERVER NAME 1301 | STRUCTURE INFORMATION 1302 | | | |
|---|---|---|---|---|
| | 13021 | 13022 | 13023 | 13024 |
| vserver1 | APO1 | APO2 | APO3 | APO4 |
| | MIDDLEWARE1 | | MIDDLEWARE2 | |
| | DRIVER1 | | DRIVER2 | |
| | OS1 | | | |
| vserver2 | ... | | | |

FIG. 3J

SERVER MANAGEMENT TABLE 131

| SERVER NAME | CPU | MEMORY | HDD | ... |
|---|---|---|---|---|
| pserver1 | Xeon 3.46GHz | 4096MB | 320GB | ... |
| vserver1 | Xeon 3.46GHz | 2048MB | 160GB | ... |
| vserver2 | Xeon 3.46GHz | 1024MB | 80GB | ... |
| pserver2 | Xeon 2.67GHz | 2048MB | 500GB | ... |
| ... | ... | ... | ... | ... |

PATCH MANAGEMENT TABLE 132

| SOFTWARE NAME | VIRTUAL SERVER NAME | PRIOR-TO-UPDATE VERSION | POST-UPDATE VERSION | UPDATE DATE AND TIME |
|---|---|---|---|---|
| OS1 | vserver1 | 1.0.0 | 1.0.1 | 2008/4/1 10:30 |
| OS2 | vserver1 | 1.0.0 | 1.0.1 | 2008/4/1 10:30 |
| AP01 | vserver1 | 3.0.0 | 3.0.1 | 2008/4/1 15:30 |
| AP02 | vserver1 | 3.0.0 | 3.0.2 | 2008/4/1 18:00 |
| ... | ... | ... | ... | |

METHOD FOR ANALYZING FAULT CAUSED IN VIRTUALIZED ENVIRONMENT, AND MANAGEMENT SERVER

CROSS-REFERENCE TO RELATED APPLICATIONS

The present application claims priority from Japanese Patent Application No. 2008-227401 filed on Sep. 4, 2008 and No. 2009-135441 filed on Jun. 4, 2009, the contents of which are herein incorporated by reference.

BACKGROUND

1. Field of the Invention

The present invention is related to a method for analyzing a fault caused in a virtualized environment in which is implemented a virtual server implemented by a virtualization mechanism operating on a physical server, and a management server, and more particularly, to a technology for easy and fast identification of a site where a fault has been caused in a virtualized environment.

2. Related Art

Recently, a technology generally referred to as virtualization has been drawing attention. Virtualization is aimed at efficient utilization, load balancing, and securing usability, etc. of hardware resources attendant upon improvements in performance of information processing systems. In handling a fault occurring in an information processing system, fast and secure measures are required in order to avoid negative impact on businesses. However, it is not so easy to identify a site where a fault has been caused in an environment like that described above to which virtualization is applied.

For example, in the case if occurrence of a fault is reported from a business process operating in a virtual server, in order to identify which has caused the fault, the business process, the virtual server, or the physical server, it is necessary to analyze the log information stored respectively in the business process, the virtual server, and the physical server to identify the site where the fault is caused according to the result of the analysis. This procedure requires a large amount of labor.

As a technology for identifying a cause of a fault, for example, Japanese Patent Application Laid-open Publication No. 2007-323244 discloses one in which, in order to allow a system manager to quickly refer to the log of a virtual server in a case in which a certain fault has been caused in a virtual server in a virtual server environment, a history of migration of the virtual server is created and stored every time the virtual server is migrated from one physical server to another and the history is managed in an integrated fashion. Further, Japanese Patent Application Laid-open Publication No. Hei04-257035 discloses that in processing of fault information under a virtual machine system, in order to achieve early detection and early handling of an abnormality in a peripheral device, when a fault occurs in a peripheral device while the virtual machine system is operating, an abnormality notification system under each guest virtual machine analyzes and classifies the logging information detected by an operating system under a guest virtual machine and/or a host system, and automatically notifies a maintenance center of the fault with an actual machine number.

Both of the technologies disclosed in the above patent documents postulate that humans such as maintenance staff analyze the log information. Therefore, labor required for analysis upon occurrence of a fault in a virtualized environment is not necessarily lessened. That is, these technologies cannot realize easy and quick identification of a cause of a fault and handling of the fault.

SUMMARY

The present invention was conceived in view of the above problems and it is therefore the object of the present invention to provide a method for analyzing a fault in a virtualized environment and a management server that enable easy and quick identification of a location where a fault has been caused in a virtualized environment.

One of the inventions that accomplishes the above and other objects is a method of analyzing a fault occurring in a virtualized environment implemented by a virtual server realized by a virtualization mechanism operating in a physical server, the physical server being communicatively connected with a management server, the management server performing steps in the method, the method comprising the steps of storing a mapping table in which a correspondence between the virtual server and the physical server implementing the virtual server is registered, accumulating and storing a first event history of a history of events having occurred in the virtual server and a second event history of a history of events having occurred in the physical server, when receiving an event relating to a fault of a business process operating in the virtual server, searching one or more event histories as accumulated and stored for the first event history on the virtual server having transmitted the same event and the second event history obtained from the mapping table on the physical server implementing the virtual server having transmitted the event, and identifying a cause of a fault based on a result of the search.

The above and other problems and solutions thereto disclosed herein will become apparent from the following description of the embodiments of the present invention with reference to the accompanying drawings.

According to the present invention, easy and quick identification of a site where a fault has been caused in a virtualized environment can be carried out.

BRIEF DESCRIPTION OF THE DRAWINGS

FIG. 3A shows an example of an event history table 121;

FIG. 3B shows an example of an active server mapping table 122;

FIG. 3C shows an example of a virtual server event analysis policy table 124;

FIG. 3D shows an example of a physical server event analysis policy table 125;

FIG. 3E is an example of an analysis history table 123;

FIG. 3F is an example of a corrective action table 126;

FIG. 3G is an example of an application management table 127;

FIG. 3J is an example of a dependency management table 130;

FIG. 3K is an example of a server management table 131;

FIG. 3L is an example of a patch management table 132;

DETAILED DESCRIPTION OF THE EMBODIMENTS

Figure 1A:
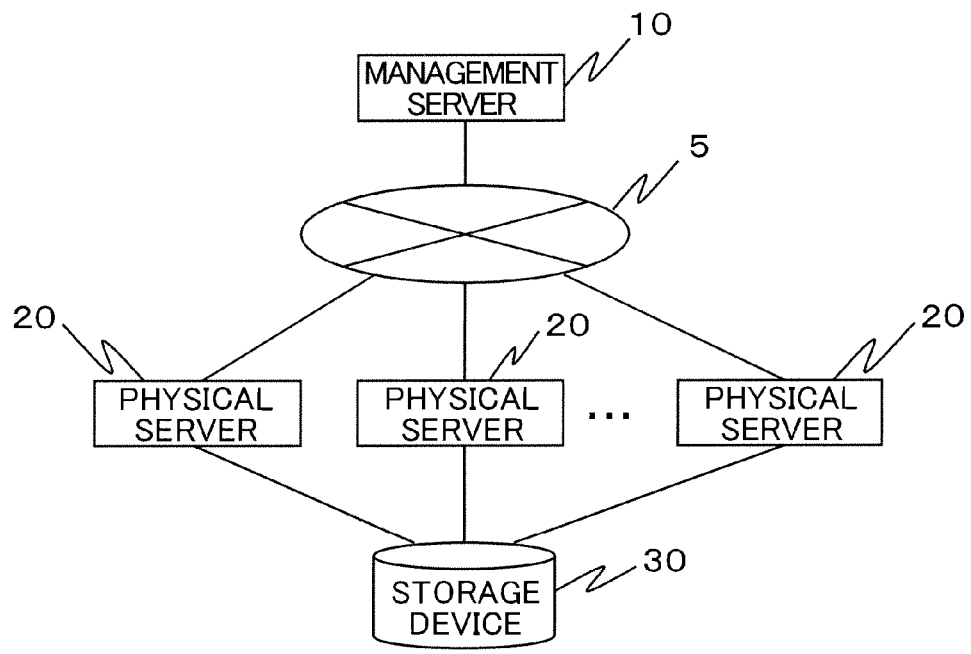
FIG. 1A shows a hardware environment adopted to implement a virtualized system 1.

In FIG. 1A is shown a hardware environment adopted for implementing a virtualized system which is described as an embodiment. As shown therein, the hardware environment is configured to include a management server 10, one or more physical servers 20 communicatively connected with the management server 10 via a communication network 5 and monitored by the management server 10, and a storage device 30 accessible from the physical server 20.

The communication network 5 connecting the management server 10 with the physical server 20 is, for example, a LAN (Local Area Network). The physical server 20 and the storage device 30 are communicatively connected with each other through a LAN or a SAN (Storage Area Network). The storage device 30 is, for example, a disk array device or a NAS (Network Attached Storage).

Figure 1B:
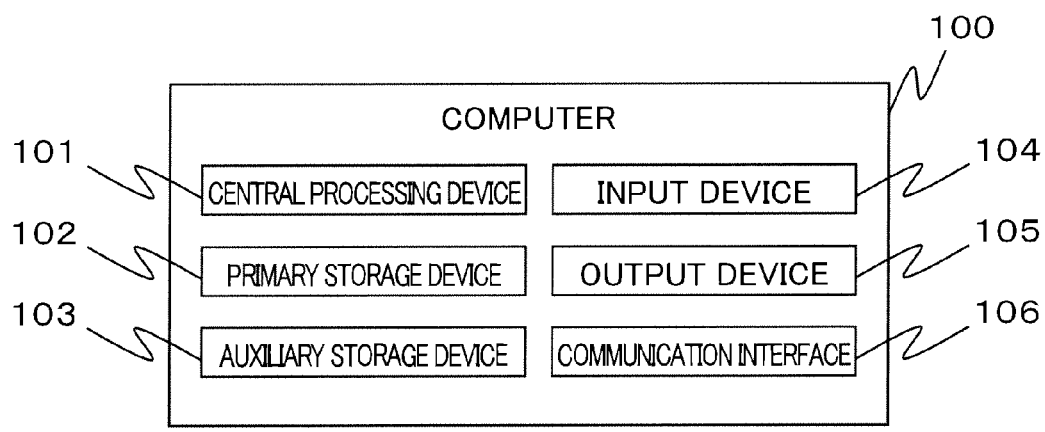
FIG. 1B is an example of a computer to be used as a management server 10 and a physical server 20.

The management server 10 and the physical server 20 may be computers (information processing apparatuses) such as a personal computer, or a blade installed in a blade server, a work station, or a mainframe. An example of the computer to be used as the management server 10 or a physical server 20 is shown in FIG. 1B. The computer 100 shown in the figure includes a central processing device 101 such as a CPU (Central Processing Unit) or an MPU (Micro Processing Unit), a primary storage device 102 such as a RAM (Random Access Memory) or a ROM (Read Only Memory), an auxiliary storage device 103 such as a hard disk drive, an input device 104 such as a keyboard or a mouse for accepting operational inputs from a user, an output device 105 such as an LCD (Liquid Crystal Display) monitor, and a communication interface 106 such as a NIC (Network Interface Card) for implementing communication with other devices through the communication network 5.

<Management Server 10>

Figure 2A:
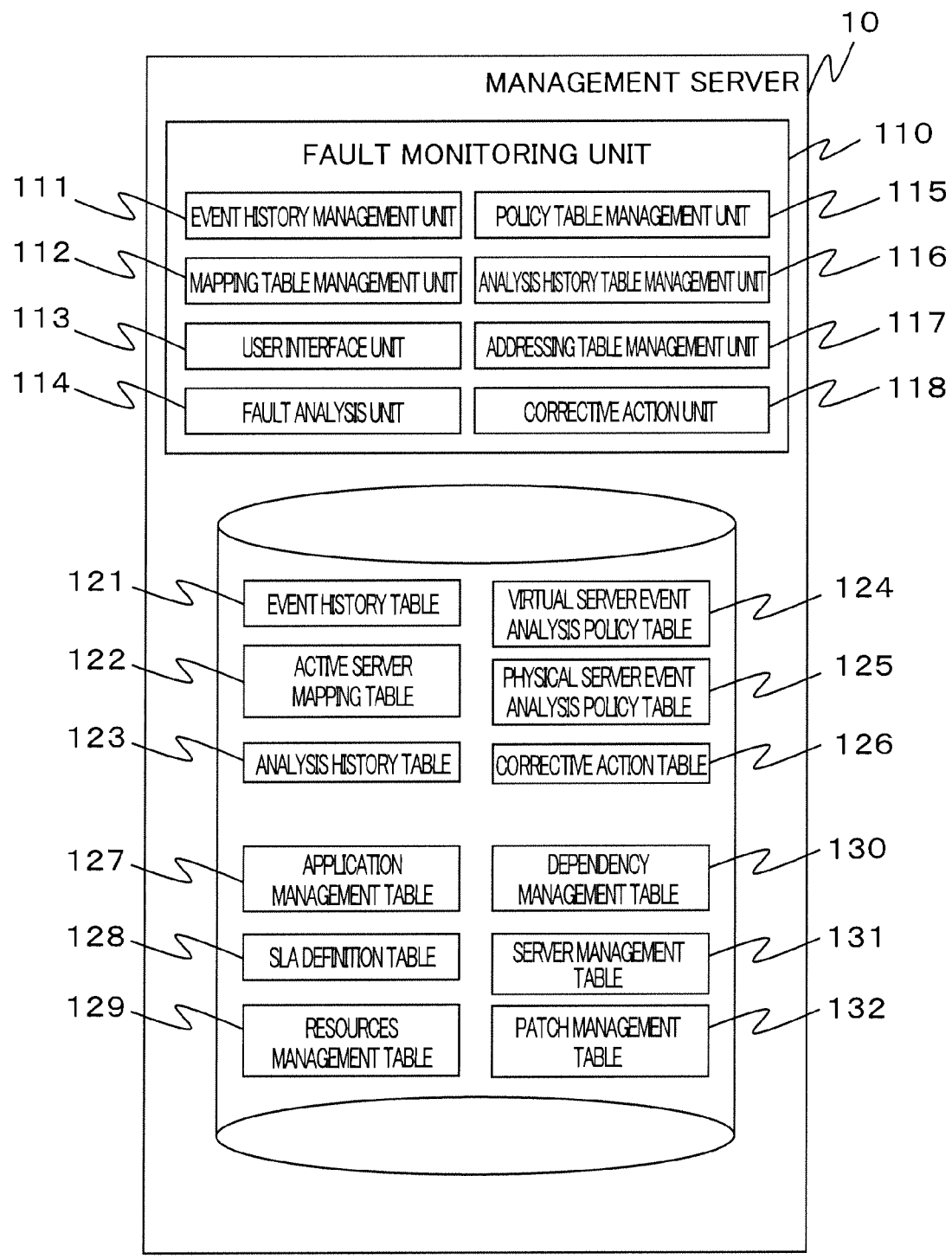
FIG. 2A shows functions of the management server 10 and data managed in the management server 10.

In FIG. 2A, the functions implemented in the management server 10 and the data managed by the management server 10 are shown. It is to be noted that each function in the figure is implemented by the central processing device 101 reading out and executing a program stored in the primary storage device 102 or the auxiliary storage device 103, or as a function of the hardware itself in the management server 10.

As shown in the figure, the program for implementing the function of identifying a cause of a fault occurring in the physical server 20 (hereinafter referred to as the fault monitoring unit 110) is executed in the management server 10. The fault monitoring unit 110 includes an event history management unit 111, a mapping table management unit 112, a user interface unit 113, a fault analysis unit 114, a policy table management unit 115, an analysis history table management unit 116, a corrective action table management unit 117, and a corrective action unit 118. The management server 10 manages an event history table 121, an active server mapping table 122, an analysis history table 123, a virtual server event analysis policy table 124, a physical server event analysis policy table 125, a corrective action table 126, an application management table 127, an SLA definition table 128, a resource management table 129, a dependency management table 130, a server management table 131, and a patch management table 132.

Among the functions shown in FIG. 2A, the event history management unit 111 registers in the event history table 121 an event history of the physical server 20 based on the information transmitted from a physical event notification unit 213 (second event history). Meanwhile, the event history management unit 111 registers in the event history table 121 an event history of the virtual server 212 based on the information transmitted from a virtual event notification unit 2123 (first event history).

An example of the event history table 121 is shown in FIG. 3A. Each record in the figure is an event history of a single event having occurred in the physical server 20 or the virtual server 212. Each event history contains the following items: a server name 311 in which the information identifying the server (the physical server 20 or the virtual server 212) where an event has occurred is set; an occurrence date and time 312 in which the date and time when the event has occurred is set; a process name 313 in which the information identifying a process where the event has occurred is set; a message 314 in which an error message and the like is set; and an event type 315 in which the information indicating the type of event having occurred such as an error (Error), a warning (Warning), general information (Information) and the like is set.

Note that, in the figure, the event history in which the name beginning with the letter "p" is set in the server name 311 is the one transmitted from the physical event notification unit 213 of the physical server 20. The event history in which the name beginning with the letter "v" is set in the server name 311 is the one transmitted from the virtual event notification unit 2123.

As described above, the event history table 121 in FIG. 3A contains both the event history provided by the physical event notification unit 213 and the event history provided by the virtual event notification unit 2123. Event histories of different types may be managed in separate tables.

The mapping table management unit 112 in FIG. 2A manages the active server mapping table 122. The mapping table management unit 112 obtains the information to be registered in the active server mapping table 122 regarding the virtualization mechanism 211 actively or passively, and reflects the obtained information in the active server mapping table 122.

An example of the active server mapping table 122 is shown in FIG. 3B. In the active server mapping table 122 are a process name 321 in which the information identifying a business process 2122 is set, a virtual server name 322 in which the information identifying the virtual server 212 where the business process 2122 is being carried out is set, a physical server name 323 in which the information identifying the physical server 20 implementing the virtual server 212 is set, and a virtual server operation starting date and time 324 when the virtual server 212 has started operation, all registered in mutually correlated manner. Note that the content of the active server mapping table 122 is updated, for example, when the virtual server 212 has been migrated as described later.

The user interface unit 113 in FIG. 2A accepts operational inputs that a user provides to the input device 104, such as operational inputs for indicating launch of or exit from a program.

The fault analysis unit 114 in FIG. 2A analyzes the event history registered in the event history table 121 when any fault has occurred in the business process 2122 and registers the result of analysis in the analysis history table 123.

The policy table management unit 115 in FIG. 2A manages the virtual server event analysis policy table 124 and the physical server event analysis policy table 125. In the tables are registered search conditions (first search condition, second search condition) used when the fault analysis unit 114 searches the event history table 121 upon analysis of a fault.

An example of the virtual server event analysis policy table 124 is shown in FIG. 3C. As shown in the figure, in the virtual server event analysis policy table 124 are registered one or more records including a search condition 331 for searching the event history table 121 for an event history and a cause location 332 as the information set according to the search result obtained for the search condition. Here, the content of the search condition 331 in the record in the first row of the table describes searching the event history table 121 for the event history including a specific server name ($virtual server$) set in the virtual server name 311 and the character string "connect error" that means communication error in the message 314. The content of the search condition 331 in the record in the second row of the table describes searching the event history table 121 for the event history including a specific server name ($virtual server$) set in the virtual server name 311, "aa" in the process name 313, and the character string "error" in the message 314. The content of the search condition 331 in the record in the third row of the table describes searching the event history table 121 for the event history including a specific server name ($virtual server$) set in the virtual server name 311, "bb" in the process name 313, and the character string "fault" in the message 314. The content of the search condition 331 in the record in the fourth row of the table describes searching the event history table 121 for the event history including a specific server name ($virtual server$) set in the virtual server name 311, and either "Error" set in the event type 315 or the character string "error" in the message 314.

An example of the physical server event analysis policy table 125 is shown in FIG. 3D. In the table are registered one or more records including a search condition 341 for searching the event history table 121 for an event history, a cause location 342 as the information set according to the search result obtained for the search condition, and an error level 343 in which an error level is set. Here, the content of the search condition 341 in the record in the first row of the table describes searching the event history table 121 for the event history including a specific server name ($physical server$) set in the physical server name 311, "bb" set in the process name 313, and the character string "Error" in the event type 315. The content of the search condition 341 in the record in the second row of the table describes searching the event history table 121 for the event history including a specific server name ($physical server$) set in the physical server name 311, "aa" set in the process name 313, and the character string "error" in the message 314. The content of the search condition 331 in the record in the third row of the table describes searching the event history table 121 for the event history including a specific server name ($physical server$) set in the physical server name 311 and the character string "memory fault" in the message 314. The content of the search condition 331 in the record in the fourth row of the table describes searching the event history table 121 for the event history including a specific server name ($physical server$) set in the physical server name 311 and "ee" set in the process name 313. The content of the search condition 341 in the record in the fifth row of the table describes searching the event history table 121 for the event history including a specific server name ($physical server$) set in the physical server name 311, "bb" set in the process name 313, and the character string "warning" in the message 314. The content of the search condition 341 in the record in the sixth row of the table describes determining "true" if it is determined that none of the specific server names ($physical server$) is included in the event history table 121.

The analysis history table management unit 116 shown in FIG. 2A manages the contents of the analysis history table 123 according to the user's operational inputs accepted from the user interface unit 113. FIG. 3E shows an example of the analysis history table 123. Each record of the analysis history table 123 includes the following items: a virtual server event 351 in which the information on the virtual server that the fault analysis unit 114 has retrieved from the event history table 121 is recorded; a physical server event 352 in which the information on the physical server that the fault analysis unit 114 has retrieved from the event history table 121 is recorded; and an analysis result 353 in which the content is set according to the virtual server event 351 or the physical server event 352.

The address table management unit 117 shown in FIG. 2A manages the content of the corrective action table 126 according to the operational inputs by a user accepted from the user interface unit 113. An example of the corrective action table 126 is shown in FIG. 3F. As shown in the figure, each record in the corrective action table 126 contains a plurality of records, each record including an error level 361 in which an error level is set and a corrective action 362 in which the content of corrective action for a fault set corresponding to the error level 361 is defined.

The corrective action unit 118 in FIG. 2A performs a processing corresponding to the content of the fault analyzed at the fault analysis unit 114. The details of the application management table 127, the SLA definition table 128, the resource management table 129, the dependency management table 130, the server management table 131, and the patch management table 132 will be described later.

<Physical Server 20>

Figure 2B:
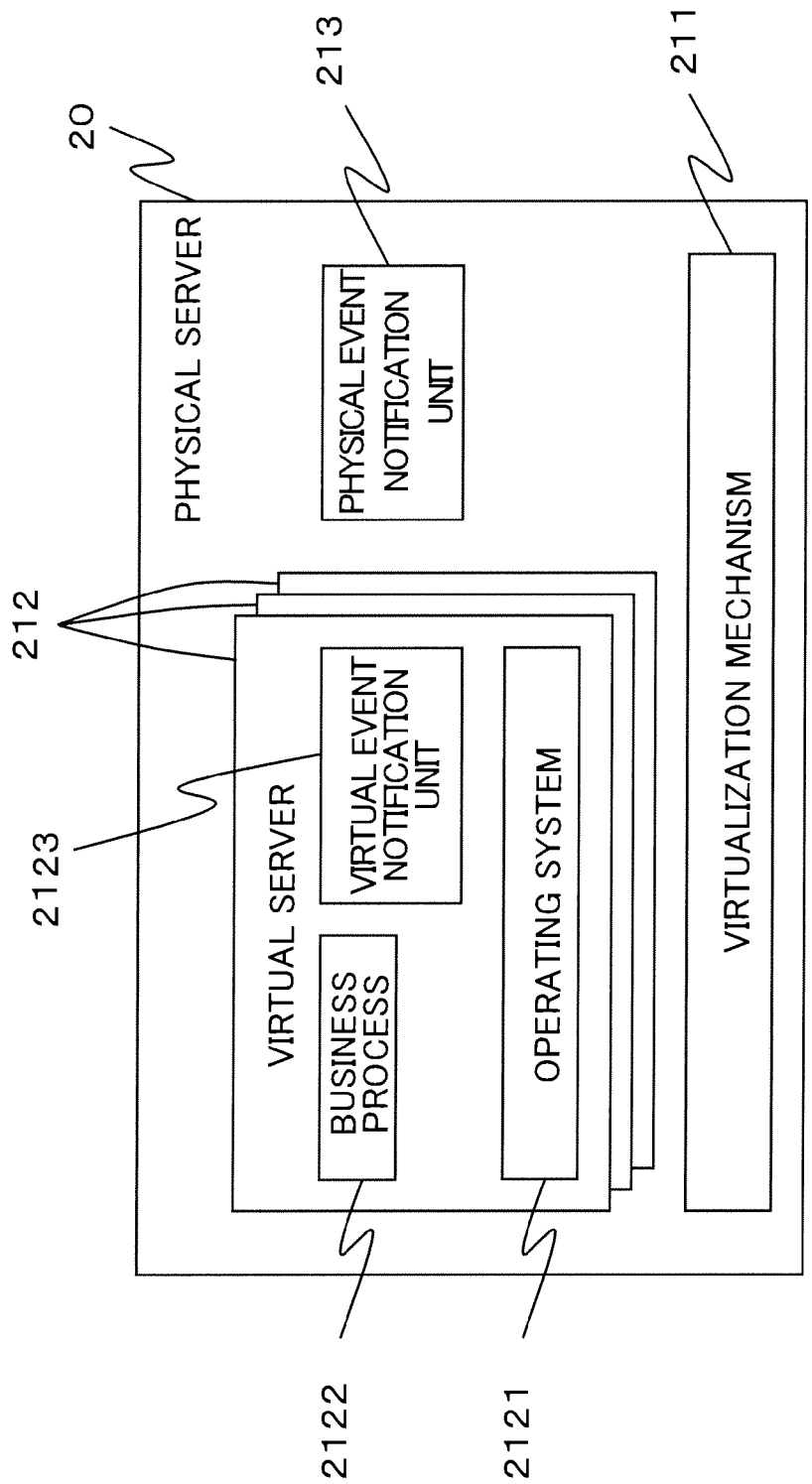
FIG. 2B shows functions of the physical server 20 and data managed in the physical server 20.

The functions implemented at the physical server 20 and the data managed by the physical server 20 are shown in FIG. 2B. Each function in the figure is implemented by the central processing device 101 of the physical server 20 reading out and executing the program stored in the primary storage device 102 or the auxiliary storage device 103 or as the inherent function of the hardware constituting the physical server 20.

As shown in the figure, the physical server 20 includes the virtualization mechanism 211, one or more virtual servers 212 implemented by the virtualization mechanism, and the physical event notification unit 213. An operating system 2121 is operating in each virtual server 212 in which a business process 2122 and a virtual event notification unit 2123 are implemented based on the operating system 2121.

The virtualization mechanism 211 shown in the figure implements the function of virtualizing the resources provided by the physical server 20 and having the physical resources (resources) provided by the physical server 20 recognized as one or more logical resources by an end user, an application, an operating system, and the like. A plurality of the virtual servers 212 shown in the figure are the logical resources (virtual computers) respectively implemented by the virtualization mechanism 211. Each virtual server 212 is enabled to operate independently from every other.

It is to be noted that the virtual server 212 may be implemented, for example, by the following methods: constructing a hardware emulation environment by an operating system (host OS) operating on the physical resources (hardware) of the physical server 20 and having the operating system 2121 of the virtual server 212 (guest OS) operate in the environment (host OS method), or constructing an emulation environment directly on the physical resources without providing a host OS and having the guest OS operate in the environment (virtual machine monitor method). As a method of emulating the physical resources, either a full virtualization method of fully emulating the physical resources or a para-virtualization method of emulating only a part of the physical resources may be employed.

A memory image corresponding to each virtual server 212 (virtual server image) is stored in the storage device 30. Migrating the virtual server 212 (changing the correspondence between the virtual server 212 and the physical server 20) can be achieved by deploying the virtual server image on the storage area of the storage device 30 allocated to the corresponding physical server 20. The above migration is carried out according to, for example, the function of the virtualization mechanism 211 or an instruction from the management server 10.

The operating system 2121 operates in each virtual server 212, and the business process 2122 and the virtual event notification unit 2123 are operated on the operating system 2121. When an event occurs in any of the virtual servers 212, the virtual event notification unit 2123 operating in the virtual server 212 notifies the management server 10 of the event history corresponding to the occurrence via the communication network 5.

The physical event notification unit 213 operating in each physical server 20 notifies the management server 10 of the event history corresponding to the event having occurred in the physical server 20 via the communication network 5. The physical event notification unit 213 accepts an instruction for performing a corrective action process (for a fault that has occurred) from the corrective action unit 118 of the management server 10 via the communication network 5 and performs the corrective action process corresponding to the instruction for performance as accepted.

<Description of Processing>

The processing performed by the fault monitoring unit 110 will be described referring to the flowchart shown in FIG. 4A. Note that the letter "S" placed at the head of each symbol stands for "step" in the following description.

The fault monitoring unit 110 performs real-time monitoring of whether or not the user interface unit 113 has accepted an operation for termination from a user (S411). If the termination operation has been accepted from a user (S411: YES), the processing is terminated. If the termination operation is not accepted (S411: NO), the processing proceeds to S412.

At S412, the fault monitoring unit 110 judges whether or not a fault has occurred in the business process 2122 in the virtual server 212. For example, the fault monitoring unit 110 judges that a fault has occurred if it has received a new event history on a fault (error) in the business process 2122 from the virtual event notification unit 2123. Further, the fault monitoring unit 110 judges that a fault has occurred if the event history on an error in the business process 2122 is newly registered in the event history table 121. If it is judged that a fault has occurred (S412: YES), the processing proceeds to S413. If a fault has not occurred (S412: NO), the processing returns to S411.

At S413, the fault analysis unit 114 performs the process of identifying a cause of the fault and labeling the fault that has occurred with an error level (hereinafter referred to as the analyzing process). The details of the analyzing process (S413) are shown in FIG. 4B. Firstly, the fault analysis unit 114 searches the event history table 121 for an event history on the virtual server 212 in which the business process 2122 with the fault is executed (S4131). The search is performed using the search condition 331 (first search condition) registered in the virtual server event analysis policy table 124. In other words, the search is performed while the virtual server name (ex. "vserver1") described in the event history that is the ground for judgment of fault occurrence is set as the parameter "$virtual server$" described in the search condition 331 shown in FIG. 3C.

Alternatively, the above search may be performed using as a search key the server name (virtual server name) of the virtual server 212 described in the event history that is the ground for judgment of fault occurrence at S412.

For example, in a case in which the content of the event history table 121 is identical to that in FIG. 3A and the virtual server name as a search key is "vserver1", the event histories in the second and the fifth rows of the figure are searched. In a case in which the physical server name as a search key is "pserver1", the fault analysis unit 114 obtains the corresponding virtual server name "vserver1" from the active server mapping table 122 and searches the event history in the second and the fifth rows using the virtual server name "vserver1" as obtained as a search key. It is to be noted that the event history that is the ground for judgment of fault occurrence is to be excluded from the objects of search.

Here, in a case in which the event histories over a long time are managed in the event history table 121, or a time cycle for deletion of the event history is set long, only the event histories for the events that have occurred within a predetermined time period from an occurrence date and time 312 when the events corresponding to the event history that is the ground for judgment of fault occurrence occurred may be selected as the objects to be searched. Alternatively, only the event histories for the events that have occurred within a predetermined time period from a date and time set in the virtual server operation start date and time 324 obtained from the active server mapping table 122 (for example, a time period from the date and time set in the virtual server operation start date and time 324 to the date and time set in the occurrence date and time 312 for the event) using the virtual server name 322 or the physical server name 323 (obtained from the event history that is the ground for judgment of fault occurrence) as a search key may be selected as the objects to be searched. As described above, by setting the events near the time of fault occurrence as the objects to be searched, analysis accuracy can be improved.

At S4132, the fault analysis unit 114 judges whether or not one or more event histories on the virtual server 212 has been retrieved in the search at S4131 (S4132). If not retrieved (S4132: NO), the processing proceeds to S4133. If retrieved (S4132: YES), the processing proceeds to S4134.

At S4133, the fault analysis unit 114 registers the content of the event history including a ground for judgment of fault occurrence at S412 in the analysis history table 123 as a virtual server event 351 and also registers "business process" in the cause location 3531 and "1" in the error level 3532 of the corresponding analysis result 353. Then, the processing proceeds to S414 in FIG. 4A. In summary, the fault analysis unit 114 judges that the cause of the fault is in the business process 2122 based on the fact that the event history of the virtual server 212 is not retrieved at S4131.

At S4134, the fault analysis unit 114 searches the event history table 121 for an event history on the physical server 20 in which the business process 2122 with the fault is executed.

It is to be noted that if the event history above is the one notified from the virtual event notification unit 2123 of the virtual server 212, the fault analysis unit 114 obtains the physical server name corresponding to the server name (virtual server name) described in the event history from the active server mapping table 122 and searches the event history table 121 for the event history using the obtained physical server name as a search key. For example, if the content of the event history table 121 is identical to that in FIG. 3A (The event history including a ground for judgment of fault occurrence is omitted in the figure.) and the physical server name as a search key is "pserver1", the event history in the first row is searched. If the virtual server name as a search key is "vserver1", the fault analysis unit 114 obtains the corresponding physical server name, "pserver1" from the active server mapping table 122 and searches the event history in the first row using the obtained physical server name, "pserver1" as a search key.

It is to be noted that the event history on the physical server 20 may be searched using the search condition registered in the physical server event analysis policy table 125 (second search condition) instead of using the server name as a key. In this case, the search is performed while the physical server name (ex. "pserver1") described in the event history that is the ground for judgment of fault occurrence is set as the parameter "$physical server$" described in the search condition 341 shown in FIG. 3D.

Similarly to the description above, in a case in which the event histories over a long time are managed in the event history table 121, or a time cycle for deletion of the event history is set long, only the event histories for the events that have occurred within a predetermined time period from an occurrence date and time 312 when the events occurred corresponding to the event history that is the ground for judgment of fault occurrence may be selected as the objects to be searched. Alternatively, only the event histories for the events that have occurred within a predetermined time period from a date and time set in the virtual server operation start date and time 324 obtained from the active server mapping table 122 (for example, a time period from the date and time set in the virtual server operation start date and time 324 to the date and time set in the occurrence date and time 312 for the event) using the virtual server name 322 or the physical server name 323 (obtained from the event history that is the ground for judgment of fault occurrence) as a search key may be selected as the objects to be searched.

At S4135, the fault analysis unit 114 judges whether or not one or more event histories on the physical server 20 have been retrieved in the search at S4134 (S4135). If not retrieved (S4135: NO), the processing proceeds to S4136. If retrieved (S4135: YES), the processing proceeds to S4147.

At S4136, the fault analysis unit 114 registers the content of the event history that is judged to be a ground for fault occurrence at S412 as a physical server event 352 in the analysis history table 123, and registers "virtual server" in the cause location 3531 and "2" in the error level 3532 respectively in the corresponding analysis result 353. Then, the processing proceeds to S414 in FIG. 4A. In summary, the fault analysis unit 114 judges that the cause of the fault is in the virtual server 212 since the event history of the virtual server 212 was retrieved at S4131 and the event history of the physical server 20 was not retrieved at S4134.

At S4137, the fault analysis unit 114 judges whether or not a cause location for the fault (first fault location) corresponding to the event history of the virtual server 212 retrieved (using the first search condition) at S4131 coincides with a cause location for the fault (second fault location) corresponding to the event history of the physical server 20 retrieved (using the second search condition) at S4134. Here, in a case in which the search condition registered in the virtual server event analysis policy table 124 or the physical server event analysis policy table 125 is used, the cause location for the above fault corresponding to the event history is the cause location 332, 342 correlated with the search condition that was used in searching the event history as retrieved in the virtual server event analysis policy table 124 or the physical server event analysis policy table 125. Further, in a case in which the event history was searched using the virtual server name or the physical server name described in the event history as a search key, the fault analysis unit 114 identifies the cause location for the fault based on the message 314, the event type 315, and the like described in the event history as retrieved. If the cause locations coincide (S4137: YES), the processing proceeds to S4138. If the cause locations do not coincide (S4137: NO), the processing proceeds to S4136. In summary, the fault analysis unit 114 judges that the cause of the fault is in the virtual server 212 since the event histories of the virtual server 212 and the physical server 20 were retrieved at S4131 and S4134 respectively, but the cause locations of the event histories did not coincide.

At S4138, the fault analysis unit 114 registers the content of the event history that is judged to be a ground for fault occurrence at S412 as the virtual server event 351 and the physical server event 352 in the analysis history table 123, and registers "physical server" in the cause location 3531 and "3" in the error level 3532 respectively in the corresponding analysis result 353. Then, the processing proceeds to S414 in FIG. 4A. In summary, the fault analysis unit 114 judges that there is significant possibility that the cause of the fault is in the physical server 20 since the event histories of the virtual server 212 and the physical server 20 were retrieved at S4131 and at S4134 respectively, and the cause locations of the respective event histories coincided in judgment in S4137.

According to the fault analysis process S413 as described above, easy and quick processing with high accuracy is enabled in determining where a cause for a fault exists, whether in the business process 2122, in the virtual server 212, or in the physical server 20. Meanwhile, since analysis is made based on the content of the event history table 121 that is subject to real-time updating, a cause of a fault can be identified within a short time period from the occurrence of the fault. Therefore, it is possible to effectively handle a fault requiring urgent resolution.

Figure 4A:
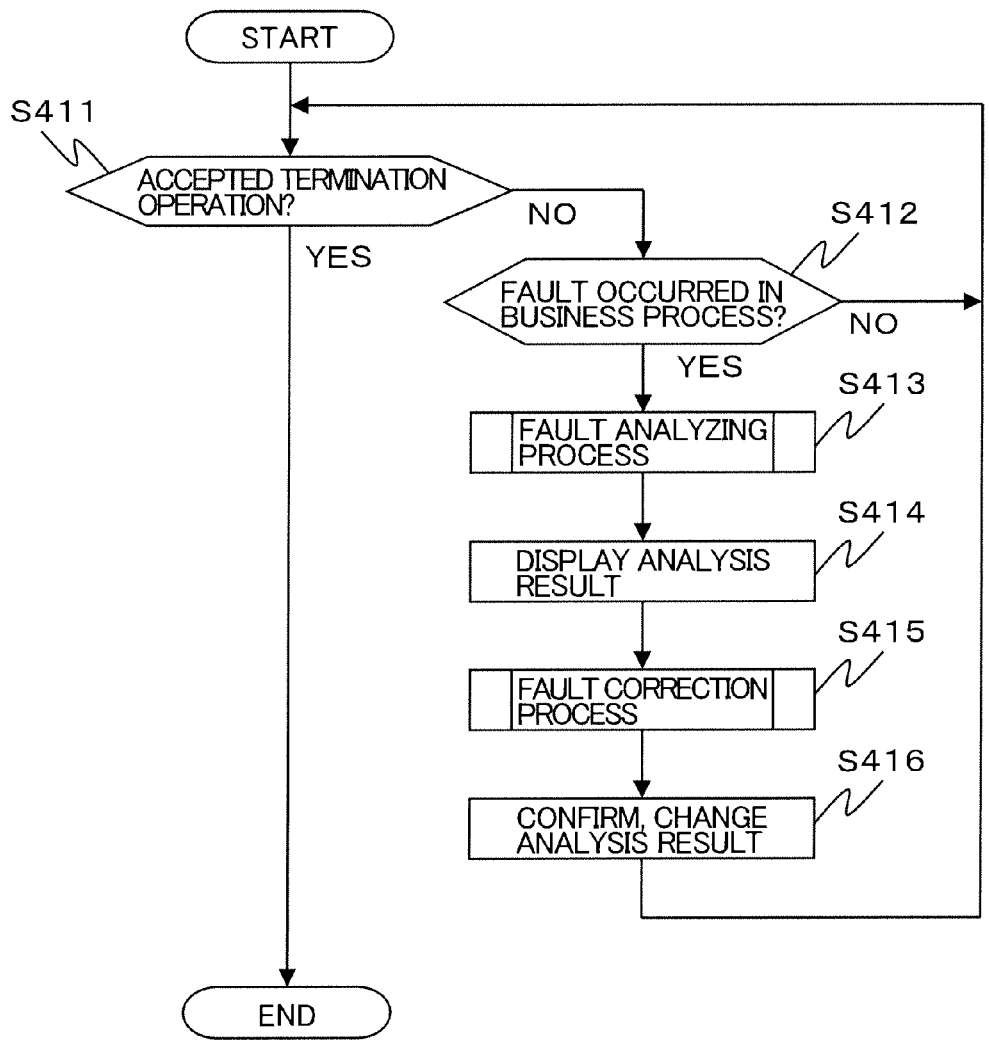
FIG. 4A is a flowchart describing a processing carried out by a fault monitoring unit 110.

At S414 in FIG. 4A, the user interface unit 113 outputs the content of the analysis history table 123 to the output device 105 of the management server 10. The user interface unit 113 provides an environment for editing the analysis result 353 in the content of the analysis history table 123 as output. The analysis history table management unit 116 reflects the content of the edited analysis result 353 in the analysis history table 123. Further, the analysis history table management unit 116 reflects the edited content of the analysis history table 123 in the virtual server event analysis policy table 124 or the physical server event analysis policy table 125. Accordingly, accuracy in correspondence between the search condition 331 in the virtual server event analysis policy table 124 and the cause location 332, or accuracy in correspondence among the search condition 341 in the physical server event analysis policy table 125, the cause location 342, and the error level 343 can be enhanced. As a result, accuracy in analysis of the cause of a fault can be improved.

=Handling Faults=

At S415 in FIG. 4A, the corrective action unit 118 executes processing according to the cause of a fault (hereinafter referred to as the fault correction process S415). The corrective action unit 118 utilizes an application management table 127, an SLA definition table 128, a resources management table 129, a dependency management table 130, a server management table 131, and a patch management table 132 shown in FIG. 2A in the fault correction process S415. First, the details of the tables will be described.

FIG. 3G shows an example of the application management table 127 of the above tables. In the application management table 127 is managed the information on an application executed in the virtual server 212. As shown in the figure, the application management table 127 is constructed from one or more records including an AP name 1271 in which an application name is set, a process name 1272 in which the name of the processing corresponding to the application as indicated by the AP name 1271 is set, a process ID 1273 in which an identifier for the processing corresponding to the process name as indicated in the process name 1272 is set, a virtual server name 1274 in which the name of the virtual server 212 where the application as indicated by the AP name 1271 is operating is set, and a related SLA 1275 in which the name of the SLA (Service Level Agreement) of the virtual server 212 as indicated in the virtual server name 1274 is set.

Figure 3H:
FIG. 3H is an example of an SLA definition table 128.
Figure 4B:
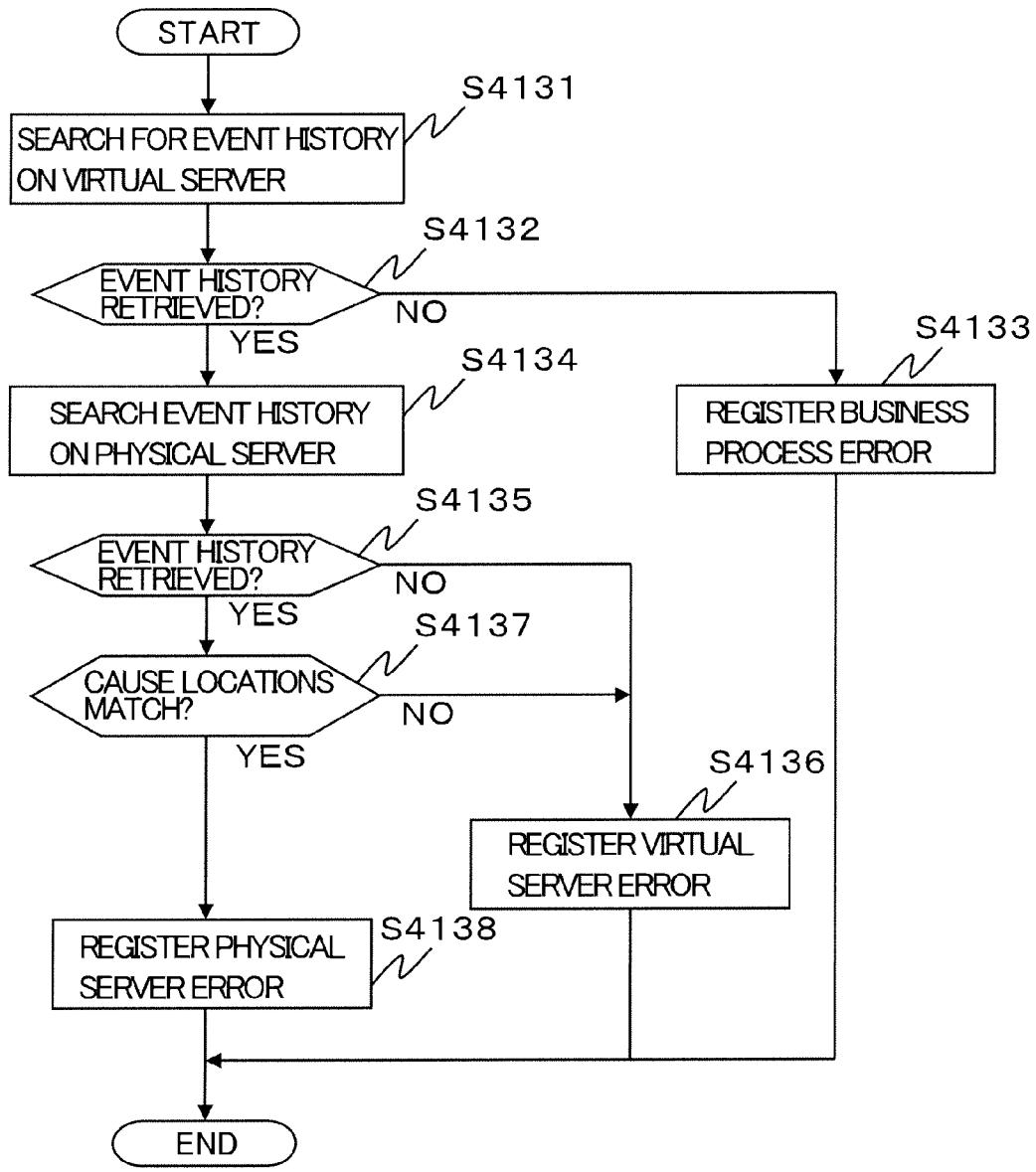
FIG. 4B is a flowchart describing in detail an analyzing process (S413)

An example of the SLA definition table 128 is shown in FIG. 3H. In the SLA definition table 128 is managed the information on each SLA. As shown in the figure, the SLA definition table 128 is constructed from one or more records including an SLA name 1281 in which the name of an SLA is set, and an SLA content 1282 in which the content of the SLA described in the SLA name 1281 is set.

Figure 3I:
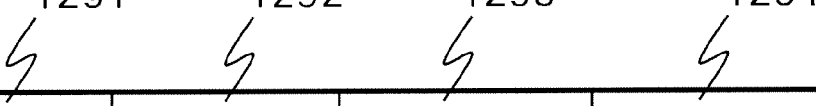
FIG. 3I is an example of a resource management table 129.

An example of the resources management table 129 is shown in FIG. 3I. In the resources management table 129 is managed an amount of the resources used by the software executed in the virtual server 212. As shown in the figure, the resources management table 129 is constructed from one or more records including an AP name 1291 in which the name of is the software is set, a process name 1292 in which the name of the process of the software as indicated in the AP name 1291 is set, a used memory amount 1293 in which a capacity of the memory used by the process as indicated in the process name 1292 is set, and a used disk amount 1294 in which a capacity of the disk used by the process as indicated in the process name 1292 is set.

An example of the dependency management table 130 is shown in FIG. 3J. In the dependency management table 130 is managed a dependency (or a layer structure) among various types of software operating on (or installed in) the virtual server 212, such as an application, middleware, a driver, an operating system (OS). As shown in the figure, the dependency management table 130 is constructed from one or more records including a virtual server name 1301 in which the name of the virtual server 212 is set, and structure information 1302 in which a dependency in the virtual server 212 corresponding to the virtual server name in the virtual server name 1301 is set. Further, as shown in the figure, the structure information 1302 includes hierarchical subrecords indicating the dependency among various types of software, such as an application 13021, middleware 13022, a driver 13023, and an operating system 13024.

An example of the server management table 131 is shown in FIG. 3K. In the server management table 131 is managed the (available) resources that the physical server 20 or the virtual server 212 possesses. As shown in the figure, the server management table 131 is constructed from one or more records including a server name 1311 in which the names of the physical server 20 and the virtual server 212 is set, a CPU 1312 in which the information on the processor (central processing device 101) implemented in the physical server 20 or the virtual server 212 corresponding to the server name indicated in the server name 1311 (for example, a type, a kind (Xeon (registered trademark)), a processing performance such as an operation clock and an internal cache of the processor) is set, a memory 1313 in which the information on the memory (primary storage device 102) implemented in the physical server 20 or the virtual server 212 corresponding to the server name indicated in the server name 1311 (capacity, response speed, and the like) is set, an HDD 1314 in which the information on the hard disk drive (auxiliary storage device 103) implemented in the physical server 20 or the virtual server 212 corresponding to the server name indicated in the server name 1311 (capacity, response speed, and the like) is set, and information 1315 on the other resources implemented in the physical server 20 or the virtual server 212 is set.

An example of the patch management table 132 is shown in FIG. 3L. In the patch management table 132 is managed the information on the version of the software installed in the virtual server 212. As shown in the figure, the patch management table 132 is constructed from one or more records including a software name 1321 in which the name of the software is set, a virtual server name 1322 in which the name of the virtual server where the software indicated by the software name 1321 is installed is set, an update date and time 1325 indicating the date and time when the software indicated by the software name 1321 was updated, a prior-to-update version 1323 in which the version immediately preceding the current version (post-update version) is set, and a post-update version 1324 in which the version that was updated is set.

<Corrective Action Unit>

Figure 5:
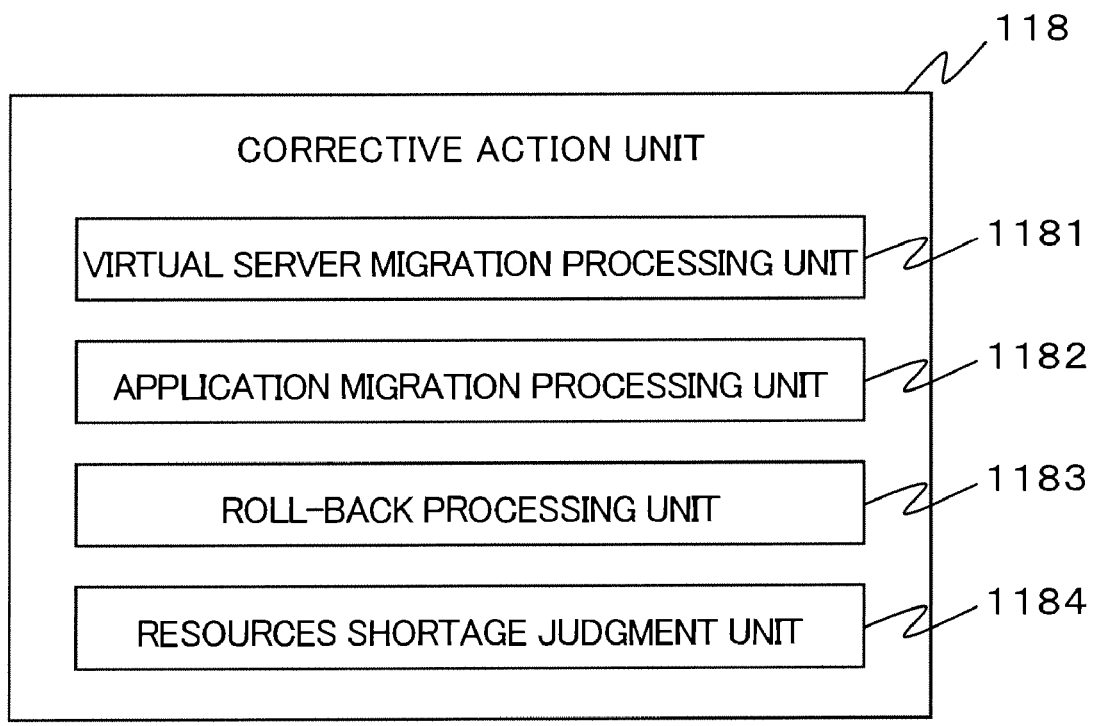
FIG. 5 shows primary functions of a corrective action unit 118.

In FIG. 5 is shown primary functions of the corrective action unit 118 in FIG. 2A. As shown in the figure, the corrective action unit 118 has as primary functional units relating to the fault correction process S415 a virtual server migration processing unit 1181 migrating the software executed in the virtual server 212 to another virtual server by the virtual server 212, an application migration processing unit 1182 migrating the software executed in the virtual server 212 by the application, a roll-back processing unit 1183 rolling back the version of the software installed in the virtual server 212 (or bringing back the version to the one before the updated version), and a resources shortage judgment unit 1184 judging whether or not the cause of the fault is shortage of resources.

<Fault Correction Process>

Figure 6:
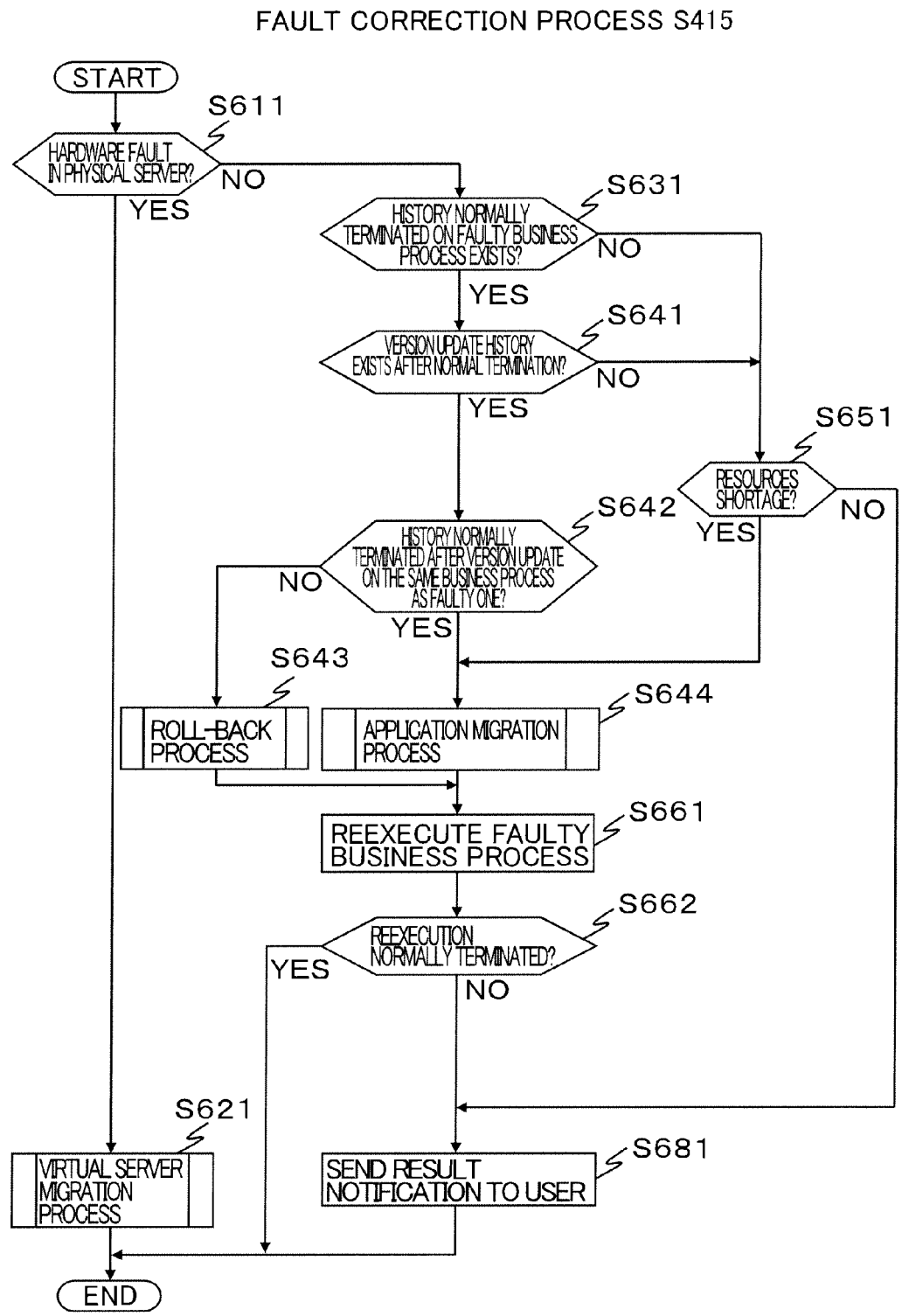
FIG. 6 is a flowchart describing an overall flow of a fault correction process S415.

FIG. 6 is a flowchart illustrating an entire processing flow of the fault correction process S415. The fault correction process S415 will be described referring to the figure hereinbelow. Note that in the description below, the virtual server 212 in which a fault has occurred is referred to as a faulty virtual server 212 and the physical server 20 implementing the faulty virtual server 212 is referred to as a faulty physical server 20. Further, the business process 2122 executed in the faulty virtual server 212 is referred to as a faulty business process 2122. The correspondence between the faulty virtual server 212 and the faulty physical server 20 can be obtained from the active server mapping table 122.

First, the corrective action unit 118 references the analysis history table 123 (in FIG. 3E), and judges whether or not the cause of the fault existing in the faulty virtual server 212 is the fault of the hardware of the faulty physical server 20 implementing the faulty virtual server 212 (S611). An example of the fault of the hardware is a disk access error of the hard disk drive 171 of the physical server 20.

In a case in which the cause of the fault is the hardware (S611: YES), the corrective action unit 118 executes the processing of migrating the faulty virtual server 212 from the faulty physical server 20 to a different physical server 20 (a processing of changing the physical server 20 implementing the faulty virtual server 212; hereinafter referred to as the virtual server migration process S621). If it is judged that the cause of the fault is not the hardware (S611: NO), the processing proceeds to S631.

<Virtual Server Migration Process>

Figure 7:
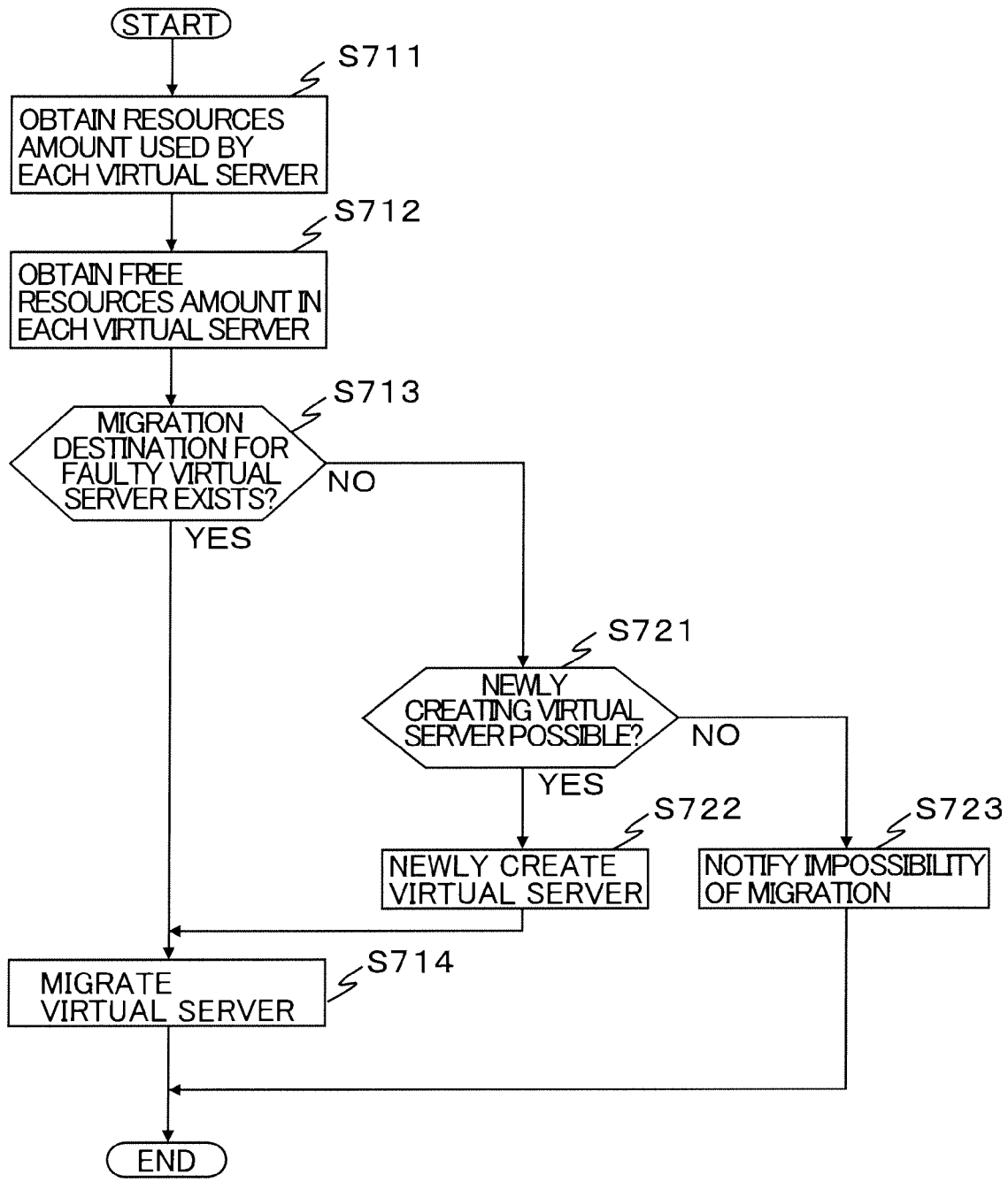
FIG. 7 is a flowchart describing a virtual server migration process S621.

FIG. 7 is a flowchart illustrating the virtual server migration process S621. In the virtual server migration process S621, the software executed in the faulty virtual server 212 is migrated to another virtual server 212 (or the physical server 20 implementing the faulty virtual server 212 is changed). The virtual server migration process S621 will be described referring to the figure hereinbelow.

First, the corrective action unit 118 identifies the software executed in each virtual server 212 managed by the management server 10 from the dependency management table 130, obtains an amount of resources to be used by each piece of software from the resources management table 129, and calculates the resources amount to be used in each virtual server 212 by summing the resources amounts as obtained above (S711).

Then, the corrective action unit 118 obtains the resources amount held in each virtual server 212 from the server management table 131, and calculates a free resources amount in each virtual server 212 using the resources amount obtained here and the resources amount calculated in S711, to be used in each virtual server 212 as managed (S712).

Then, the corrective action unit 118 searches for a different virtual server 212 to which the faulty virtual server 212 can be migrated by comparing the resources amount used by the faulty virtual server 212 with the free resources amount in each virtual server 212 (S713). If it is judged that a virtual server 212 as the migration destination exists (S713: YES), the corrective action unit 118 migrates the software in the faulty virtual server 212 to that virtual server 212 (S714). It is to be noted that if a plurality of the virtual servers 212 exists as candidates for the migration destination, that virtual server 212 which has the maximum margin for the resources amount may be selected. If it is judged that a virtual server 212 allowing migration does not exist (S713: NO), the processing proceeds to S721.

At S721, the corrective action unit 118 judges whether or not it is possible to newly create the virtual server 212 (S721). This judgment can be made based on, for example, the resources amount in each physical server 20 managed by the management server 10 and the free resources amount in each physical server 20, which can be obtained from the server management table 131 and the resources management table 129.

If it is judged that the virtual server 212 can be newly created (S721: YES), the corrective action unit 118 newly creates the virtual server 212 (S722), and migrates the software in the faulty virtual server 212 to the newly created virtual server 212 (S714). If it is judged that such a physical server 20 allowing creation of a new virtual server 212 does not exist (S721: NO), the corrective action unit 118 sends a user a notification indicating that the faulty virtual server 212 cannot be migrated, for example by displaying a message to that effect on the output device 105 (S723).

As described above, when the management server 10 has judged that the cause of the fault is the fault of the hardware of the physical server 20, the management server 10 calculates the respective free resources amounts of each of the virtual server 212 managed by the management server 10, and compares the amount of the resources used by the software executed in the faulty virtual server 212 with the respectively calculated free resources amounts. Then, the management server 10 judges whether or not there exists a different virtual server 212 that allows migration of the software executed in the faulty virtual server 212. If the different virtual server 212 is judged to exist, the management server 10 migrates the software to the different virtual server 212 by the virtual server 212.

As shown above, according to the mechanism as described above, if the cause of the fault is in the physical server 20, the software in the faulty virtual server 212 is automatically migrated to a different virtual server 212. Therefore, the processing executed in the faulty virtual server 212 when the fault has occurred can be restored without trouble. Further, since a different virtual server 212 (i.e., physical server 20) that has free resources is searched for and if found selected to be the migration destination, the resources held by the virtualized system can be utilized effectively.

If the virtual server 212 having free resources cannot be found, the management server 10 judges whether or not a new virtual server 212 can be created, and if creation is judged possible, the management server 10 creates the new virtual server 212 and has the software in the faulty virtual server 212 migrated thereto. Therefore, automatic restoration of the software that has suffered the fault can be performed more reliably.

Now the description returns to FIG. 6. At S611 in FIG. 6, if it is judged that the cause of the fault is not the hardware of the faulty physical server 20 (S611: NO), the corrective action unit 118 judges whether or not there exists in the event history table 121 (in FIG. 3A) a history including normal termination of the processing (for example, the history including "Information" set in the event type 315) among the histories on the business process 2122 identical to the faulty business process 2122 (that is, the business processes 2122 sharing the same process name 313), (S631). If it is judged that the history with normal termination exists (S631: YES), the processing proceeds to S641. If judged that the history with normal termination does not exist (S631: NO), the processing proceeds to S651.

At S641, the corrective action unit 118 judges whether or not there exists in the patch management table 132 (in FIG. 3L) an update history of the faulty virtual server 212 in which its update date and time 1325 is after the occurrence date and time 312 in the history with normal termination as found at S631 (hereinafter referred to as the version update history). If judged such a version update history exists (S641: YES), the processing proceeds to S642. If such history is judged not to exist (S641: NO), the processing proceeds to S651.

At S642, the corrective action unit 118 judges whether or not there exists in the virtual servers 212 other than the faulty virtual server 212 (S642) the history including normal termination of the processing (for example, the history including "Information" set in the event type 315) after the version update performed after the occurrence date and time 312 in the history with normal termination as found at S631 among the histories on the business process 2122 identical to the faulty business process 2122. If it is judged that such a history does not exist (S642: NO), the processing proceeds to S643 to execute the processing of bringing the version back (version down processing; hereinafter referred to as the roll-back process S643). That is, in this case, it is assumed that the cause of the fault is in the version update recently performed, the corrective action unit 118 executes the process for bringing the version back to the preceding one.

Figure 8:
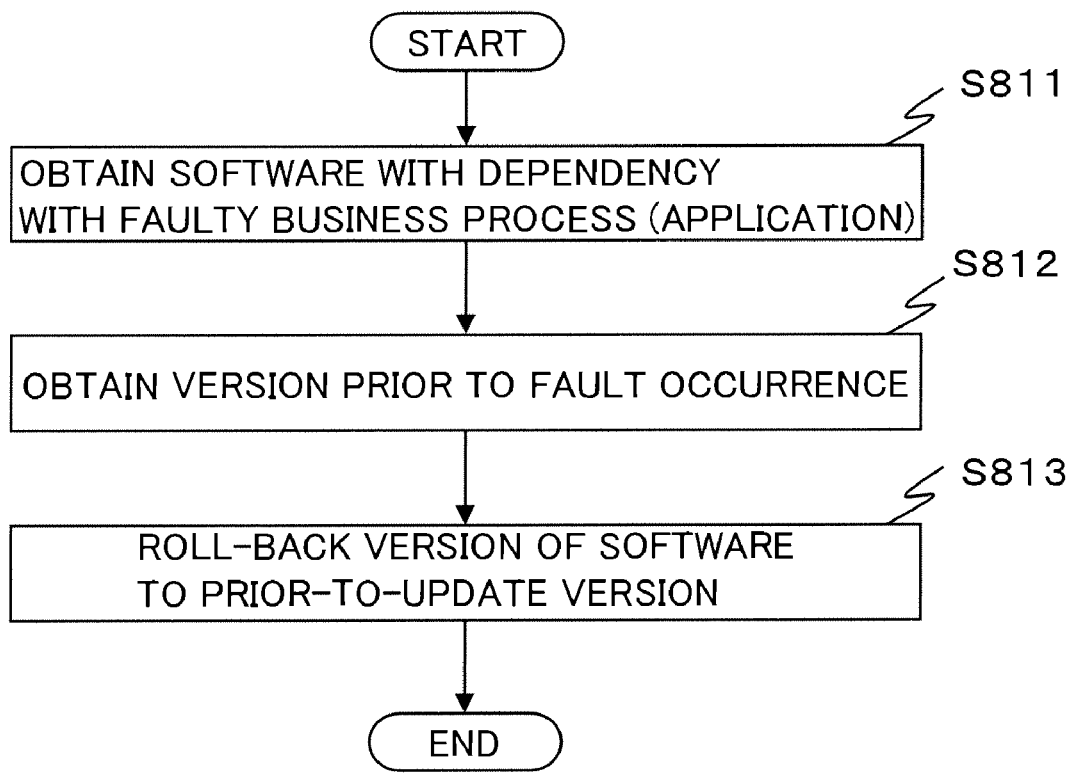
FIG. 8 is a flowchart describing a roll-back process S643.

FIG. 8 shows a flowchart for describing the roll-back process S643. First, the corrective action unit 118 identifies the software having dependency with the application implemented by the faulty business process 2122 (middleware, a driver, an operating system (OS) in the dependency management table 130 in FIG. 3J) from the dependency management table 130 (in FIG. 3J) (S811).

Then, the corrective action unit 118 obtains the version prior to the fault occurrence in each piece of software obtained at S811 (prior-to-update version 663) from the patch management table 132 (in FIG. 3L) (S812). Then, the corrective action unit 118 rolls back the version of each piece of software to the prior-to-update version (S813).

On the other hand, if it is judged that the applicable history exists at S642 (S642: YES), the processing proceeds to S644 and the corrective action unit 118 executes the process of migrating the application operating in the faulty virtual server 212 to a different virtual server 212 (hereinafter referred to as the application migration process S644). That is, in this case, since it is assumed that the recently performed version update is not necessarily the cause of the fault, the corrective action unit 118 does not perform the roll-back but does migrate the application to a different virtual server 212.

Figure 9:
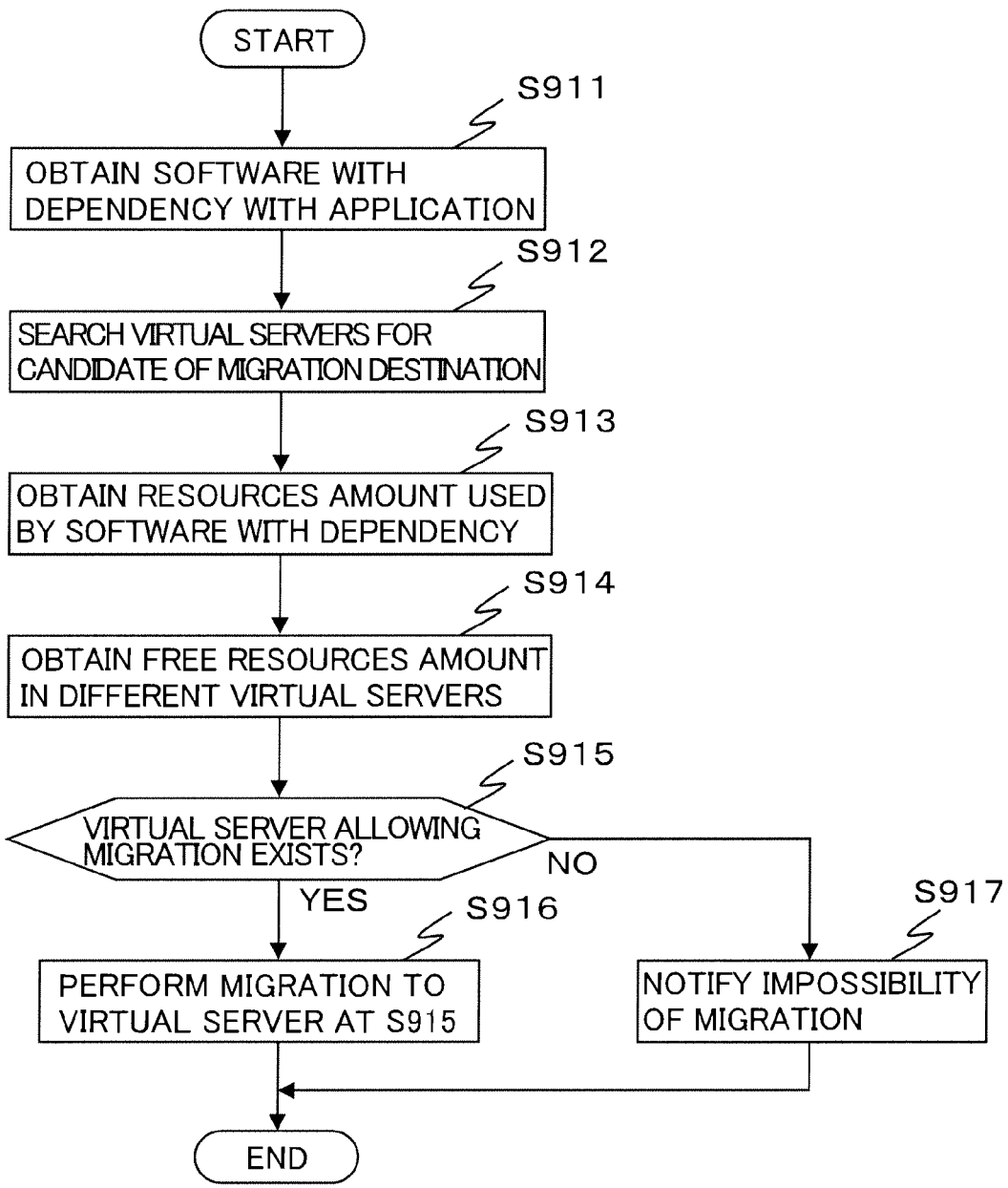
FIG. 9 is a flowchart describing an application migration process S644.

FIG. 9 shows a flowchart for describing the application migration process S644. First, the corrective action unit 118 identifies the software having dependency with the application implemented by the faulty business process 2122 (middleware, a driver, an operating system (OS) in the dependency management table 130 in FIG. 3J) from the dependency management table 130 (in FIG. 3J) (S911). It is to be noted that the application implemented by the faulty business process 2122 is determined by searching the application management table 127 using the process name 313 of the faulty business process 2122 as a search key.

Then, the corrective action unit 118 searches for a candidate migration destination for the application based on the dependency obtained at S911, the application management table 127, the dependency management table 130 (in FIG. 3J) and the SLA definition table 128 (S912).

For example, if the process name of the faulty business process 2122 is "aa", the application (AP01) is migrated in the application management table 127 in FIG. 3G. In this case, referring to the dependency management table 130 in FIG. 3J, the application (AP01) is operated in the environment including the middleware (middleware1), the driver (driver1), and the operating system (OS1). Therefore, the virtual server 212 as a migration destination is required to have the same environment. Meanwhile, since "sla001, sla003" is set in the related SLA 1275 for the application (AP01), the middleware in the virtual server 212 as a migration destination is also required to satisfy the SLAs.

Then, the corrective action unit 118 obtains the amount of resources used by each piece of software identified at S911 from the resources management table 129 (S913).

Then, the corrective action unit 118 calculates the free resources amount in the virtual server 212 as a candidate found at S912 from the server management table 131 (S914). Here, the free resources amount is obtained in the same manner described with respect to S711 in FIG. 7, for example.

Then, the corrective action unit 118 compares the free resources amount in the virtual server 212 as a candidate of the migration destination calculated at S914 with the resources amount used by each piece of software identified at S911 and obtained at S913, and judges whether or not there exists the virtual server 212 that allows migration of the application (S915).

If it is judged that the virtual server 212 allowing the migration exists (S915: YES), the corrective action unit 118 migrates the application in the faulty virtual server 212 to that virtual server 212 for which it is judged that migration is possible (S916). If it is judged that the virtual server 212 allowing the migration does not exist (S915: NO), the corrective action unit 118 sends a user a notification indicating that the migration of the software in the faulty virtual server 212 is not possible through the output device 105 (S917).

As described above, if the corrective action unit 118 has judged that the cause of the fault is not in the hardware of the physical server 20, the corrective action unit 118 judges whether or not there exists an execution history including the faulty business process 2122 that was terminated normally after the update of the software based on the execution history of the faulty business process 2122 and the update history of the software implementing the faulty business process 2122. Then, if it is judged that the above execution history does not exist, the corrective action unit 118 rolls back the version of the software. As described above, the management server 10 according to the present embodiment precisely identifies the cause of a fault and takes appropriate action, enabling secure recovery from the fault.

By contrast, if it is judged that the execution history with normal termination exists, the corrective action unit 118 migrates the faulty business process 2122 (application) to a different virtual server 212. Accordingly, since the management server 10 of the present embodiment identifies the cause of a fault more accurately and performs migration by the application, quick and secure recovery from the fault is accomplished.

Here, a description is given of S651 in FIG. 6. At S651, the corrective action unit 118 judges whether or not the cause of a fault is shortage of resources. If it is judged that the cause is a resources shortage (S651: YES), the processing proceeds to S644. If it is judged that the cause is not a shortage of resources (S651: NO), the processing proceeds to S681.

The judgment whether or not the cause of a fault is a shortage of resources is made, for example, by calculating resources amount used by the faulty business process 2122 from the resources management table 129 and the dependency management table 130, and comparing the calculated resources amount with the free resources amount of the faulty physical server 20 calculated by, for example, the method described with respect to S711.

If it is judged that no update history of the faulty business process 2122 after normal termination exists (S641: NO), whether or not there is a resources shortage is judged by, for example, the following steps. First, the corrective action unit 118 obtains multiplicity in the execution of the business process 2122 in the faulty virtual server 212 at occurrence of the fault. In the meantime, the corrective action unit 118 obtains multiplicity in executing the business process 2122 at the time of the normal termination described above from the event history table 121. Then, for example, the corrective action unit 118 judges that the cause of the fault is a resources shortage if the multiplicity at the fault occurrence is greater than the multiplicity at the normal termination, and judges that the cause is not a shortage of resources if the multiplicity at the fault occurrence is less than or equal to the multiplicity at the normal termination.

As described above, the corrective action unit 118 judges whether or not the cause of the fault is a resources shortage, and, if it is judged that the cause is a resources shortage (S651: YES), migrates the faulty business process 2122 (application) to a different virtual server 212. Accordingly, since the management server 10 of the present embodiment quickly judges that the cause of the fault is a resources shortage and performs migration by the application, quick and secure recovery from the fault is accomplished. Further, since the management server 10 of the present embodiment determines whether or not the cause of the fault is a resources shortage through an optimal process according to the circumstances (if "NO" at S631 or "NO" at S651), quick and secure recovery from the fault is accomplished.

At S661 in FIG. 6, the corrective action unit 118 reexecutes the faulty business process 2122. At S662, the corrective action unit 118 judges whether or not the result of the reexecution is normal termination. If judged normal termination (S662: YES), the processing is terminated. If judged not normal termination (S662: NO), the corrective action unit 118 sends a user a notification indicating that the corrective action is not terminated normally through the output device 105 (S681). Note that on sending the notification, for example, progress information of the processing executed in the fault correction process S415 (log information) may be also sent to the user.

Although the present invention has been described in detail hereinabove based on the embodiments thereof referring to the accompanying drawings, the present invention is not to be construed as being limited to the above embodiments. It is also to be understood that any variants and equivalents fall under the scope of the present invention without departing from the spirit of the present invention. For example, the error level set according to the cause of the fault is not necessarily limited to those described above, but may be set by a user at his/her discretion.

What is claimed is:

1. A method of analyzing a fault occurring in a virtualized environment implemented by a virtual server realized by a virtualization mechanism operating in a physical server, the physical server being communicatively connected with a management server, the management server performing steps in the method, the method comprising the steps of:
storing a mapping table in which a correspondence between the virtual server and the physical server implementing the virtual server is registered;
accumulating and storing a first event history of a history of events having occurred in the virtual server and a second event history of a history of events having occurred in the physical server;
when receiving an event relating to a fault of a business process operating in the virtual server, searching one or more event histories as accumulated and stored for the first event history on the virtual server having transmitted the same event and the second event history obtained from the mapping table on the physical server implementing the virtual server having transmitted the event, and identifying a cause of a fault based on a result of the search,
wherein the management server:
when the cause of the fault is judged to be in hardware of the physical server, calculates a free resources amount of each virtual server managed by the management server, compares the free resources amount as calculated with a resources amount used by the software executed in the faulty virtual server that is the virtual server, judges whether or not there exists a different virtual server to which the software executed in the faulty virtual server can be migrated, and if judged that the software can be migrated, migrates the software to the different virtual server.

2. The method of analyzing a fault according to claim 1, wherein the management server:
if judged the different virtual server to which the software executed in the faulty virtual server can be migrated does not exist, judges whether or not a virtual server can be newly created using the free resources amount in the physical server managed by the management server, and
if judged that the virtual server can be newly created, newly creates a virtual server, and migrates the software to the newly created virtual server.

3. A method of analyzing a fault occurring in a virtualized environment implemented by a virtual server realized by a virtualization mechanism operating in a physical server, the physical server being communicatively connected with a management server, the management server performing steps in the method, the method comprising the steps of:
storing a mapping table in which a correspondence between the virtual server and the physical server implementing the virtual server is registered;
accumulating and storing a first event history of a history of events having occurred in the virtual server and a second event history of a history of events having occurred in the physical server;
when receiving an event relating to a fault of a business process operating in the virtual server, searching one or more event histories as accumulated and stored for the first event history on the virtual server having transmitted the same event and the second event history obtained from the mapping table on the physical server implementing the virtual server having transmitted the event, and identifying a cause of a fault based on a result of the search,
wherein the management server:
manages an execution history of the business process executed in each of the virtual servers and an update history of software implementing the business process,
if it is judged that the cause of the fault is not in hardware of the physical server, judges whether or not there exists an execution history that was terminated normally after an update of the software for the business process in the faulty virtual server based on the execution history and the update history, and
if the execution history that was terminated normally after the update does not exist, rolls back a version of the software and restarts the software.

4. The method of analyzing a fault according to claim 3, wherein the management server:
in judging whether there exists an execution history that was terminated normally after the update of the software, and if an execution history that was terminated normally after the update does exist, compares a resources amount required to implement an application corresponding to the business process with a free resources amount in the virtual server managed by the management server, judges whether or not there exists a different virtual server to which the application can be migrated, and if the different virtual server does exist, migrates the application to the different virtual server.

5. A method of analyzing a fault occurring in a virtualized environment implemented by a virtual server realized by a virtualization mechanism operating in a physical server, the physical server being communicatively connected with a management server, the management server performing steps in the method, the method comprising the steps of:

storing a mapping table in which a correspondence between the virtual server and the physical server implementing the virtual server is registered;

accumulating and storing a first event history of a history of events having occurred in the virtual server and a second event history of a history of events having occurred in the physical server;

when receiving an event relating to a fault of a business process operating in the virtual server, searching one or more event histories as accumulated and stored for the first event history on the virtual server having transmitted the same event and the second event history obtained from the mapping table on the physical server implementing the virtual server having transmitted the event, and identifying a cause of a fault based on a result of the search, wherein the management server:

manages an execution history of the business process executed in the virtual server, judges whether or not there exists an execution history that was terminated normally after the time when the fault occurred, if judged that an execution history thus having terminated normally does not exist, judges whether or not the cause of the fault is a shortage of resources, and if judged that the cause is a shortage of resources, compares the resources amount required to implement an application corresponding to the business process with a free resources amount in the virtual server managed by the management server, judges whether or not there exists a different virtual server to which the application can be migrated, and if the different virtual server does exist, migrates the application to the different virtual server.

6. The method of analyzing a fault according to claim 5, wherein the management server compares a multiplicity of executions the business process at the time when the fault occurred with a multiplicity of executions at the time when the business process was executed normally and, according to the comparison, judges whether or not the cause of the fault is a shortage of resources.

7. A management server for analyzing a fault occurring in a virtualized environment implemented by a virtual server realized by a virtualization mechanism operating in a physical server, the management server being communicatively connected with the physical server, comprising:

a mapping table management unit that stores a mapping table in which a correspondence between the virtual server and the physical server implementing the virtual server is registered;

an event history management unit that accumulates and stores a first event history of a history of events having occurred in the virtual server and a second event history of a history of events having occurred in the physical server; and a fault analysis unit that, when receiving an event relating to a fault of a business process operating in the virtual server, searches the one or more event histories as accumulated and stored for the first event history on the virtual server having transmitted the event and the second event history obtained from the mapping table on the physical server implementing the virtual server having transmitted the event, and identifies a cause of the fault based on a result of the search, wherein the management server:

when the cause of the fault is judged to be a fault in hardware of the physical server, calculates a free resources amount of each virtual server managed by the management server, compares the free resources amount as calculated with a resources amount used by the software executed in the faulty virtual server as the virtual server, judges whether or not there exists a different virtual server to which the software executed in the faulty virtual server can be migrated, and if judged that the software can be migrated, migrates the software to the different virtual server, wherein the management server:

if judged the different virtual server to which the software executed in the faulty virtual server can be migrated does not exist, judges whether or not a virtual server can be newly created using the free resources amount in the physical server managed by the management server, and if judged that the virtual server can be newly created, newly creates a virtual server, and migrates the software to the newly created virtual server, wherein the management server:

manages an execution history of the business process executed in each of the virtual servers and an update history of software implementing the business process, if it is judged that the cause of the fault is not in the hardware of the physical server, judges whether or not there exists an execution history that was terminated normally after an update of the software for the business process in the faulty virtual server based on the execution history and the update history, and if judged that an execution history that was terminated normally after the update does not exist, rolls back a version of the software and restarts the software, wherein the management server, in judging whether there exists an execution history that was terminated normally after the update of the software, if the execution history that was terminated normally after the update does exist, compares a resources amount required to implement an application corresponding to the business process with a free resources amount in the virtual server managed by the management server, judges whether or not there exists a different virtual server to which the application can be migrated, and if the different virtual server does exist, migrates the application to the different virtual server, wherein the management server manages an execution history of the business process executed in the virtual server, judges whether or not there exists an execution history that was terminated normally after the time when the fault occurred, if the execution history thus having terminated normally does not exist, judges whether or not the cause of the fault is a shortage of resources, if judged that the cause is a shortage of resources, compares the resources amount required to implement an application corresponding to the business process with a free resources amount in the virtual server managed by the management server, judges whether or not there exists a different virtual server to which the application can be migrated, and if the different virtual server does exist, migrates the application to the different virtual server, and wherein the management server, compares a multiplicity of executions of the business process at the time when the fault occurred with a multiplicity of executions at the time when the business process was executed normally and, according to the comparison, judges whether or not the cause of the fault is a shortage of resources.

8. A computer-readable storage medium storing a computer software program that causes a management server for analyzing a fault occurring in a virtualized environment implemented by a virtual server realized by a virtualization mechanism operating in a physical server, the management server being communicatively connected with the physical server, to implement the following steps of:

referencing a mapping table in the management server in which a correspondence between the virtual server and the physical server implementing the virtual server is registered;

accumulating and storing a first event history of a history of events having occurred in the virtual server and a second event history of a history of events having occurred in the physical server; and when receiving an event relating to a fault of a business process operating in the virtual server, searching the one or more event histories as accumulated and stored for the first event history on the virtual server having transmitted the same event, and the second event history obtained from the mapping table on the physical server implementing the virtual server having transmitted the event, and identifying a cause of the fault based on a result of the search, wherein the computer software program causes the management server to implement the further steps of:

when the cause of the fault is judged to be in hardware of the physical server, calculating a free resources amount of the respective virtual servers managed by the management server, comparing the free resources amount as calculated with a resources amount used by the software executed in the faulty virtual server as the virtual server, judging whether or not there exists a different virtual server to which the software executed in the faulty virtual server can be migrated, and if judged that the software can be migrated, migrating the software to the different virtual server, if judged the different virtual server to which the software executed in the faulty virtual server can be migrated does not exist, judging whether or not a virtual server can be newly created using the free resources amount in the physical server managed by the management server, and, if judged that the virtual server can be newly created, newly creates a virtual server and migrates the software to the newly created virtual server;

managing an execution history of the business process executed in each of the virtual servers and an update history of software implementing the business process, and if it is judged that the cause of the fault is not in the hardware of the physical server, judging whether or not there exists an execution history that was terminated normally after an update of the software for the business process in the faulty virtual server based on the execution history and the update history, and if the execution history that was terminated normally after the update does not exist, rolling back a version of the software and restarting the software;

wherein, in judging whether there exists an execution history that was terminated normally after the update of the software, if the execution history that was terminated normally after the update does exist, comparing a resources amount required to implement an application corresponding to the business process with a free resources amount in the virtual server managed by the management server, judging whether or not there exists a different virtual server to which the application can be migrated, and if judged that the different virtual server exists, migrating the application to the different virtual server;

managing an execution history of the business process executed in the virtual server, judging whether or not there exists the execution history that was terminated normally after the time when the fault occurred, and if the execution history thus having terminated normally does not exist, judging whether or not the cause of the fault is shortage of resources, wherein, if judged that the cause is a shortage of resources, comparing the resources amount required to implement an application corresponding to the business process with a free resources amount in the virtual server managed by the management server, judging whether or not there exists a different virtual server to which the application can be migrated, and if judged that the different virtual server exists, migrating the application to the different virtual server; and comparing a multiplicity of executions of the business process at the time when the fault occurred with a multiplicity of executions at the time when the business process was executed normally and, according to the comparison, judging whether or not the cause of the fault is a shortage of resources.

* * * * *